No. 808,155. PATENTED DEC. 26, 1905.
G. W. HOLMES.
CULTIVATOR ATTACHMENT.
APPLICATION FILED JULY 29, 1905.
2 SHEETS—SHEET 1.
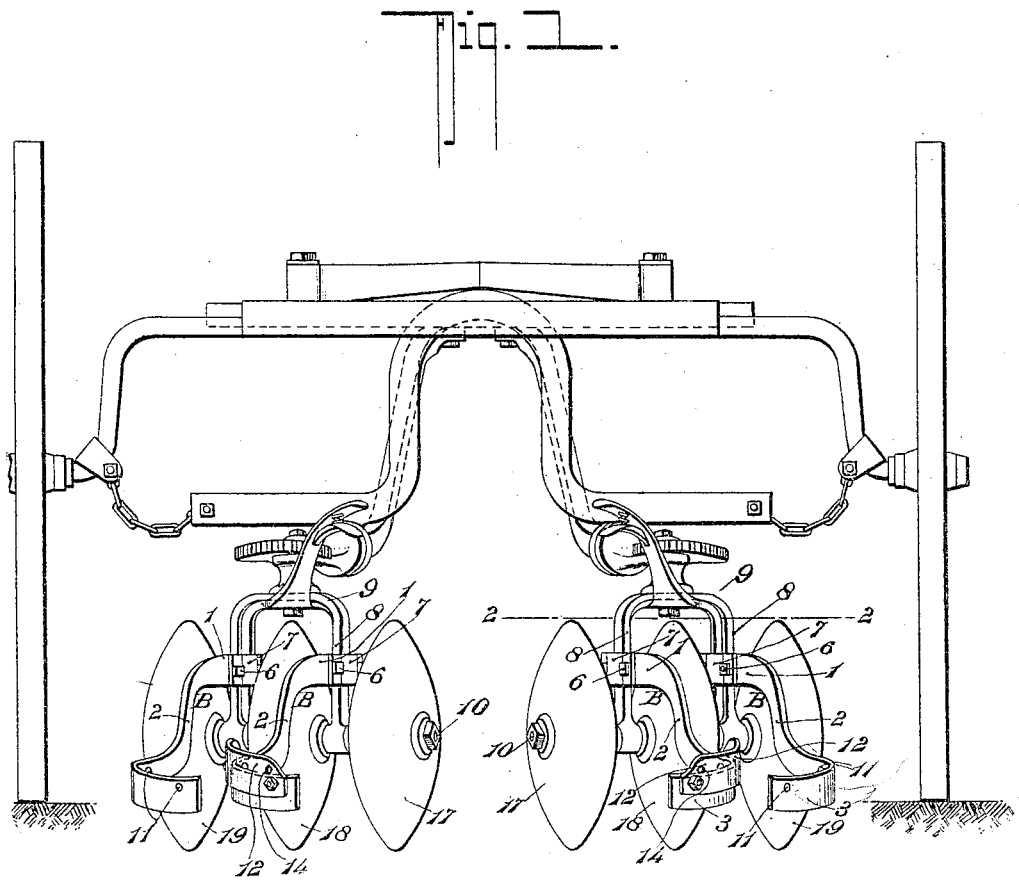
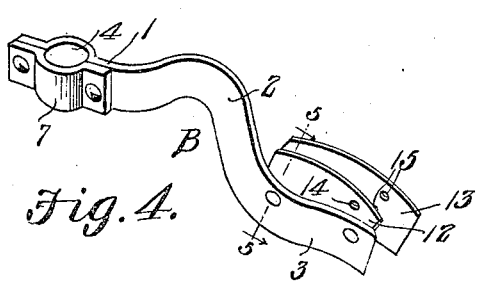
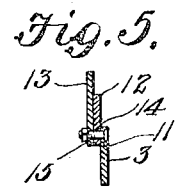
Witnesses
George W. Holmes,
Inventor.
by C. A. Snow & Co.
Attorneys No. 808,155. PATENTED DEC. 26, 1905.
G. W. HOLMES.
CULTIVATOR ATTACHMENT.
APPLICATION FILED JULY 29, 1905.

2 SHEETS—SHEET 2.

Witnesses

George W. Holmes,
Inventor.
by
Attorneys

UNITED STATES PATENT OFFICE.

GEORGE W. HOLMES, OF GREENFIELD, ILLINOIS.

CULTIVATOR ATTACHMENT.

No. 808,155.  Specification of Letters Patent.  Patented Dec. 26, 1905.

Application filed July 29, 1905. Serial No. 271,804.

*To all whom it may concern:*

Be it known that I, GEORGE W. HOLMES, a citizen of the United States, residing at Greenfield, in the county of Greene and State of Illinois, have invented a new and useful Cultivator Attachment, of which the following is a specification.

This invention relates to disk cultivators; and it is in the nature of an attachment for this class of cultivators whereby the dirt which is overturned by the action of the disks shall be operated upon with a view to crumbling and pulverizing the same and of throwing it back in the direction of the plants, the growth of which will thus be stimulated and encouraged.

The object of the invention is to simplify and improve the construction and operation of devices of the class referred to; and with this and other ends in view, which will readily appear as the nature of the invention is better understood, the same consists in the improved construction and novel arrangement and combination of parts, which will be hereinafter fully described, and particularly pointed out in the claims.

In the accompanying drawings has been illustrated a simple and preferred form of the invention, it being, however, understood that no limitation is necessarily made to the precise structural details therein exhibited, but that changes, alterations, and modifications within the scope of the invention may be resorted to when desired.

Figure 2:
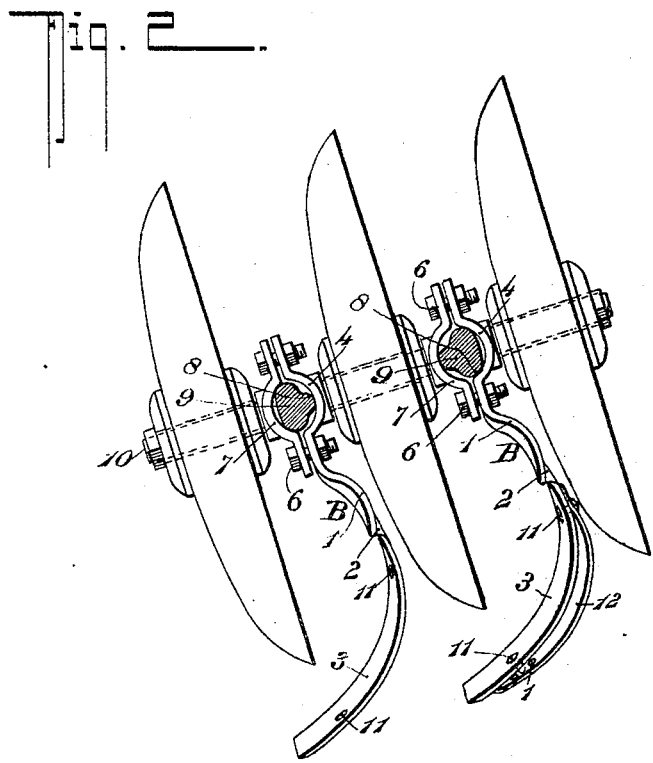
Figure 3:
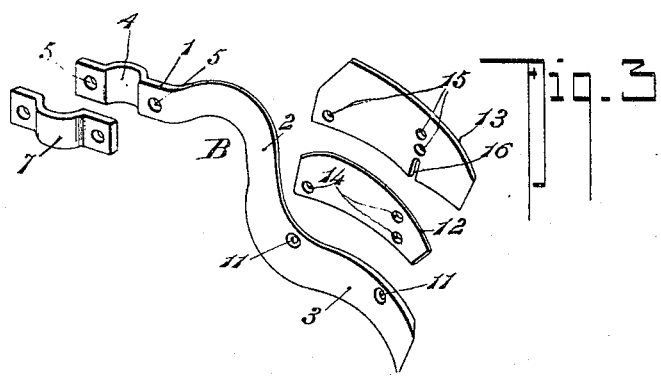

In said drawings, Figure 1 is a rear view showing as much of a wheeled disk cultivator as is necessary to illustrate the invention, which has been shown applied thereto. Fig. 2 is a horizontal sectional view, enlarged, taken on the plane indicated by the line 2 2 of Fig. 1. Fig. 3 is a view showing in perspective the several parts constituting the improved attachment separated from each other. Fig. 4 is a perspective view showing the several parts constituting the improved attachment connected with each other. Fig. 5 is a transverse sectional view of the same, taken on the line 5 5 in Fig. 4.

Corresponding parts in the several figures are denoted by like characters of reference.

The improved attachment may be described as consisting of a bar B, including a shank portion 1, having a downturned arm 2, which terminates in a laterally-extending plate 3. The bars B are made in right and left hand patterns, so that they will be applicable to the right and left gangs of the cultivator, it being understood that the plates 3 are extended laterally in an inward direction. The shank portion 1 is formed with a half-box 4, and it has perforations 5 for the reception of bolts 6, whereby a loose half-box 7 may be connected therewith, thus enabling the device or attachment to be securely clamped upon the rims 8 of the arch members 9, in which the disk-carrying shafts 10 are supported for rotation. Each gang may consist of any desired number of disks. In the drawings each gang has been shown as consisting of three disks, which is the number usually employed. The bars B, two of which have been shown in connection with each gang, are curved, so as to enable them to be placed adjacent and in close proximity to the convexed rear sides of the two outer disks of each gang.

The plates 3 are twisted to form moldboards, the tendency of which is to throw the dirt in an inward direction. Each of said plates 3 is provided with perforations 11 for the passage of bolts or other connecting means, whereby auxiliary blades, as 12 and 13, may be secured thereto for the purpose of increasing the width, and consequently the working capacity, of the moldboards. The said plates, which have been shown in Fig. 3 of the drawings, are each provided with apertures 14 and 15, whereby they may be secured in position adjustably with relation to the blades 12, and the auxiliary blade 13 is also provided at its lower edge with a notch 16, which increases its capacity for adjustment.

In Figs. 1 and 2 of the drawings the inner, the intermediate, and the outer disks of each gang are designated, respectively, 17, 18, and 19. The bars constituting the improved attachment adjacent to the intermediate disks have been shown with auxiliary blades attached thereto, and the bars placed adjacent to the outer disks have been shown as equipped with the auxiliary blades 12; but it is to be understood that as the plants that are to be operated upon advance in growth, additional auxiliary blades are to be connected with the bars as may be deemed proper in the judgment of the operator.

The operation of the invention will be readily understood from the foregoing description, taken in connection with the drawings hereto annexed. As the machine equipped with the improved attachment passes over the field, the row of plants being straddled by the gangs, the dirt will be thrown in an outward direction from the plants, causing grass and weeds to be uprooted and overturned, and thus destroyed. The dirt adhering to the roots, however, will be removed and pulverized by the blades of the attachment and will be thrown back toward the roots of the plants, covering, strengthening, and nourishing the same. After the plants attain a certain growth the attachments may be removed from the inner disks, and those which remain, in connection with the outer disks, will loosen and smooth the dirt between the rows, keeping the latter from cracking and preserving the moisture.

The improved device is simple in construction, easily applied to disk cultivators of ordinary patterns, and has proven by actual experience to be efficient and serviceable in operation.

Having thus described the invention, what is claimed is—

1. An attachment for disk cultivators including a bar terminating in a laterally-extending blade forming a moldboard, and an auxiliary blade detachably connected with said moldboard.

2. An attachment for disk cultivators including a bar terminating in a laterally-extending blade constituting a moldboard in combination with a plurality of auxiliary blades adjustably and detachably connected therewith.

In testimony that I claim the foregoing as my own I have hereto affixed my signature in the presence of two witnesses.

GEORGE W. HOLMES.

Witnesses:
Wm. B. Barnes,
Mayo Barnes.